(12) United States Patent
Somalingayya et al.

(10) Patent No.: US 9,105,415 B2
(45) Date of Patent: Aug. 11, 2015

(54) RETAINING INSERT FOR AN ELECTRICAL PROTECTION SYSTEM AND METHOD

(71) Applicant: General Electric Company, Schenectady, NY (US)

(72) Inventors: Veeresh Somalingayya, Andhra Pradesh (IN); Kiran Bhattar, Andhra Pradesh (IN); Jonathan David Potter, Southington, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 263 days.

(21) Appl. No.: 13/867,531

(22) Filed: Apr. 22, 2013

(65) Prior Publication Data

US 2014/0311878 A1    Oct. 23, 2014

(51) Int. Cl.
*H01H 9/26* (2006.01)

(52) U.S. Cl.
CPC ...................................... *H01H 9/26* (2013.01)

(58) Field of Classification Search
CPC ......... H01H 9/26; H01H 9/286; H01H 9/281; H01H 9/283
USPC ............ 200/50.3, 50.33, 43.16, 290; 361/673
See application file for complete search history.

(56) References Cited

U.S. PATENT DOCUMENTS

| 4,318,156 | A | 3/1982 | Gallagher |
| 4,902,859 | A | 2/1990 | Witzmann et al. |
| 5,393,942 | A | 2/1995 | Reiner et al. |
| 5,675,194 | A | 10/1997 | Domigan |
| 5,814,777 | A | 9/1998 | Green et al. |
| 5,874,698 | A | 2/1999 | Collis |
| 5,977,492 | A | 11/1999 | Taylor et al. |
| 6,191,500 | B1 | 2/2001 | Toy |
| 6,621,689 | B1 | 9/2003 | Flegel |
| 7,411,139 | B2 | 8/2008 | McCoy |
| 7,446,270 | B2 | 11/2008 | Somalingayya et al. |
| 7,465,892 | B2 | 12/2008 | McCoy |
| 7,864,509 | B1 | 1/2011 | Remmert |
| 2005/0109596 | A1* | 5/2005 | Quintanilla et al. .......... 200/293 |
| 2008/0149467 | A1* | 6/2008 | Somalingayya et al. .. 200/50.33 |
| 2010/0038966 | A1 | 2/2010 | Espeut, Jr. |
| 2011/0188167 | A1 | 8/2011 | True et al. |
| 2011/0310533 | A1 | 12/2011 | Cosley et al. |
| 2011/0310534 | A1 | 12/2011 | Cosley et al. |
| 2015/0001049 | A1* | 1/2015 | Bunk et al. ................. 200/43.16 |

* cited by examiner

*Primary Examiner* — Edwin A. Leon
*Assistant Examiner* — Ahmed Saeed
(74) *Attorney, Agent, or Firm* — GE Global Patent Operation; Steven G. Midgley

(57) ABSTRACT

A retaining insert coupleable to a base assembly configured to operatively support a primary circuit breaker and a pair of opposing circuit breakers that define a recess is provided. The retaining insert includes a base portion configured to be disposed between the primary circuit breaker and the pair of opposing circuit breakers, the base portion configured to be operatively coupled to the base assembly. The retaining insert also includes retaining portion extending from the base portion into the recess, the retaining portion configured to retain the pair of opposing circuit breakers.

15 Claims, 7 Drawing Sheets

RETAINING INSERT FOR AN ELECTRICAL PROTECTION SYSTEM AND METHOD

BACKGROUND OF THE INVENTION

The subject matter disclosed herein relates to circuit breakers, and more particularly to electrical circuit breaker panelboard assemblies.

Electrical circuit breaker panelboard assemblies often include a primary circuit breaker and a secondary circuit breaker for selectively switching an electrical supply to the panelboard between a primary source, such as a utility, and an auxiliary source, such as a generator. It is necessary that the primary circuit breaker and the secondary circuit breaker are prohibited from being simultaneously in a powered condition. A mechanical interlock assembly may be employed to interconnect a primary handle operated switch and a secondary handle operated switch to prevent both handles from being simultaneously disposed in a position that results in a powered condition for the primary circuit breaker and the secondary circuit breaker. The mechanical interlock is typically mounted to a cover for the front side electrical circuit breaker panelboard assembly, such that removal of the cover results in removal of the mechanical interlock, thereby leaving the primary handle and the secondary handle exposed to potential simultaneous positioning in a powered condition.

Another issue associated with existing electrical circuit breaker panelboard assemblies relates to adequate retaining of the secondary circuit breaker, which is typically merely a plug-in type. For such plug-in types, inadvertent removal of the secondary circuit breaker is undesirable. Additionally, a recess is often present between the secondary circuit breaker and a branch circuit breaker, thereby exposing live circuitry. Such exposure may pose various hazards to nearby individuals and environments.

BRIEF DESCRIPTION OF THE INVENTION

According to one aspect of the invention, a retaining insert coupleable to a base assembly configured to operatively support a primary circuit breaker and a pair of opposing circuit breakers arranged to define a recess is provided. The retaining insert includes a base portion configured to be disposed between the primary circuit breaker and the pair of opposing circuit breakers, the base portion configured to be operatively coupled to the base assembly. The retaining insert also includes retaining portion extending from the base portion into the recess, the retaining portion configured to retain the pair of opposing circuit breakers.

According to another aspect of the invention, an electrical protection system includes an enclosure having a base wall and a plurality of walls extending relatively perpendicularly from the base wall. Also includes is a base assembly coupled to an interior portion of the enclosure, the base assembly configured to operatively support a primary circuit breaker and a pair of opposing circuit breakers that define a recess. Further included is a retaining insert. The retaining insert includes a base portion operatively coupled to the base assembly. The retaining insert also includes a retaining portion comprising a first segment and a second segment, the first segment integrally formed with and extending from the base portion, the second segment integrally formed with and extending from the first segment toward the second portion of the base portion, the retaining portion configured to be at least partially disposed within the recess.

According to yet another aspect of the invention, a method of retaining an electrical panelboard assembly is provided.

The method includes fixedly securing a primary circuit breaker to a base assembly having a fixed connection to a base wall of an enclosure. Also included is connecting a secondary circuit breaker to the base assembly. Further included is aligning a base portion of a retaining insert with a gap between the primary circuit breaker and the secondary circuit breaker. Yet further included is disposing a retaining portion of the retaining insert within a recess located between the secondary circuit breaker and a branch circuit breaker for retaining the secondary circuit breaker.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
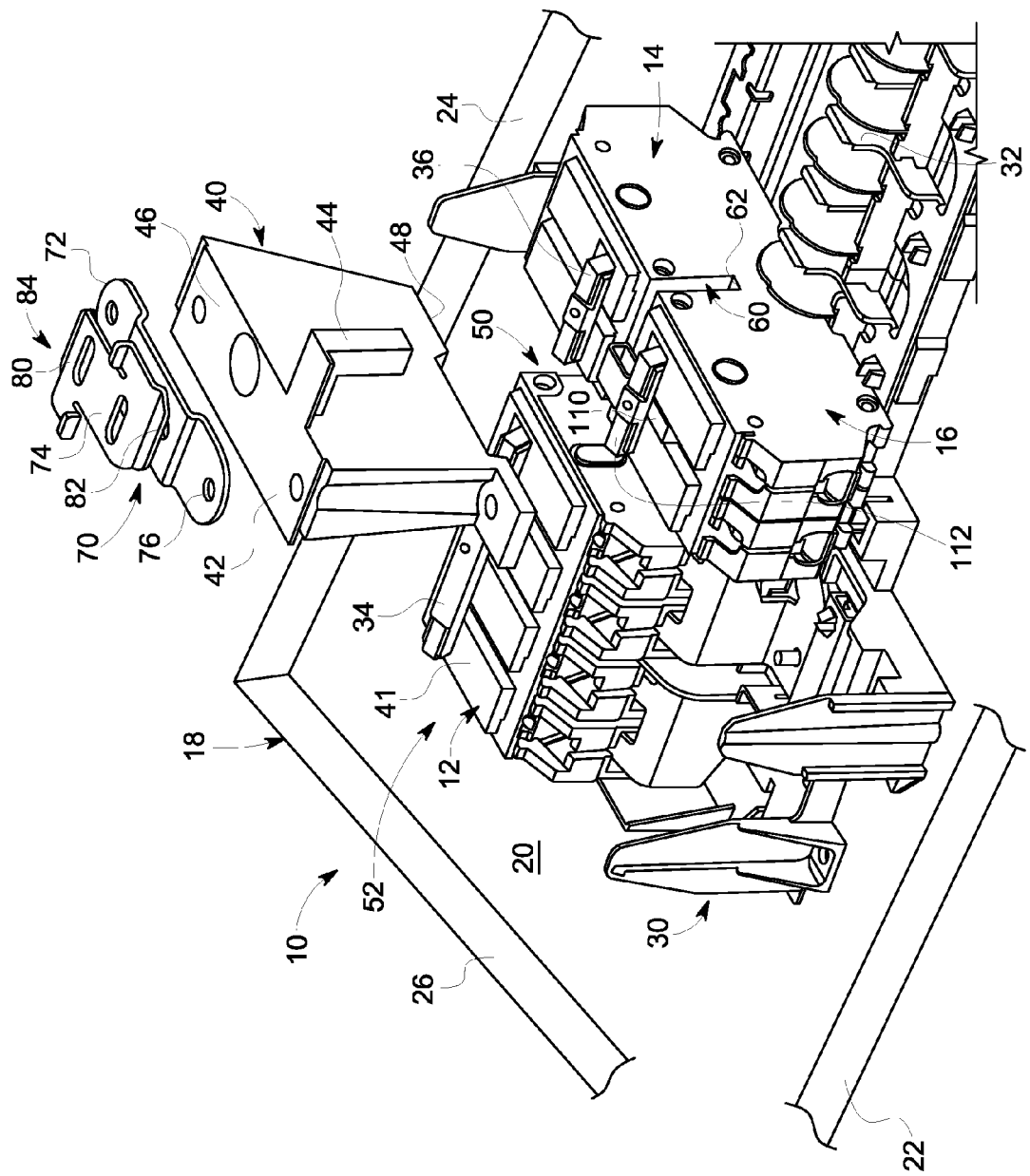
FIG. 1 is a front, perspective view of an electrical panelboard assembly.
Figure 2:
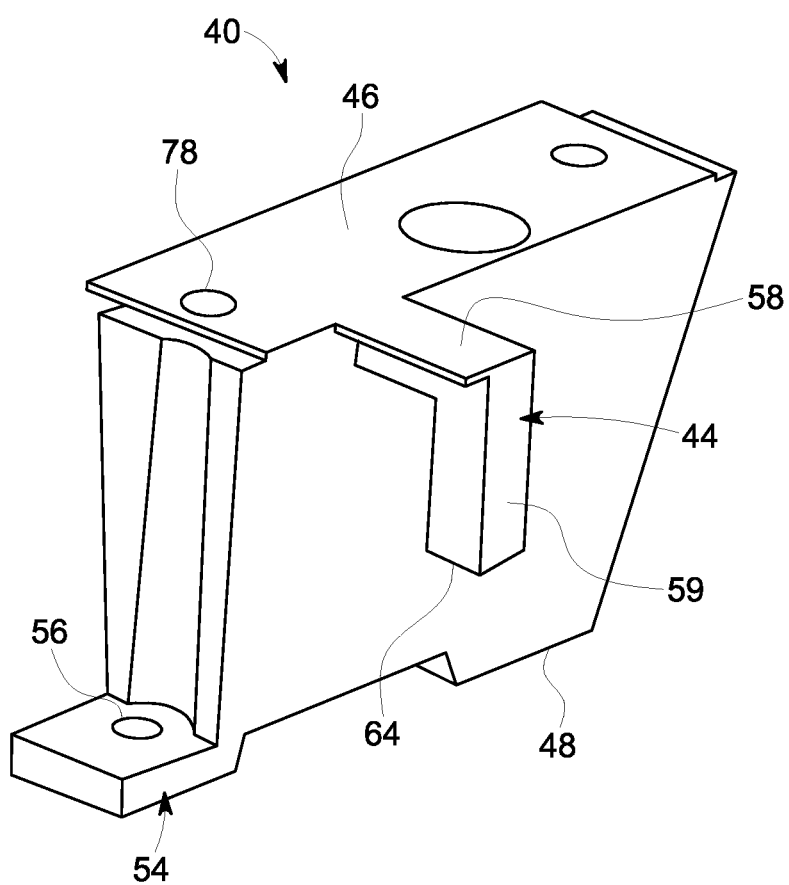
FIG. 2 is a perspective view of a retaining insert of the electrical panelboard assembly.

Referring to FIGS. 1 and 2, an electrical panelboard assembly according to a first embodiment is referenced generally with numeral 10. The electrical panelboard assembly 10 is configured to be employed in conjunction with numerous applications, such as an electrical protection system, and is suitable for both indoor and outdoor embodiments. The electrical panelboard assembly 10 includes a primary circuit breaker 12, a secondary circuit breaker 14 and a branch circuit breaker 16. The secondary circuit breaker 14 and the branch circuit breaker 16 may be collectively referred to herein as a pair of opposing circuit breakers. Typically, a plurality of branch breakers will be employed, but for simplicity of description, a single branch circuit breaker is illustrated. The primary circuit breaker 12, the secondary circuit breaker 14 and the branch circuit breaker 16 are disposed at least partially within an enclosure 18. The enclosure 18 comprises a base wall 20, a first sidewall 22, a second sidewall 24, a first end wall 26 and a second end wall (not shown), which together define a space for housing the primary circuit breaker 12, the secondary circuit breaker 14 and the branch circuit breaker 16. The first sidewall 22, the second sidewall 24, the first end wall 26 and the second end wall are integrally formed with the base wall 20, with each extending relatively perpendicularly from the base wall 20.

A base assembly 30 is operatively coupled to the base wall 20 and provides a locating and mounting interface for the primary circuit breaker 12. A plurality of studs and various other mechanical fasteners directly or indirectly secure the primary circuit breaker 12 to the base assembly 30 in a fixed manner. The base assembly 30 includes a plurality of socket arrangements 32 configured to receive the secondary circuit breaker 14 and the branch circuit breaker 16, as well as a plurality of other branch circuit breakers. The secondary circuit breaker 14 and the branch circuit breaker 16 include mating socket receptacles (not shown) corresponding to the plurality of socket arrangements 32 to achieve a plug-in connection for the secondary circuit breaker 14 and the branch circuit breaker 16.

The primary circuit breaker 12 includes a primary breaker handle 34 in operable communication with a primary circuit breaker switch for switching between a primary breaker powered position, also referred to herein as a primary breaker first position or as an ON position, and a primary breaker unpowered position, also referred to herein as a primary breaker second position or as an OFF position. FIG. 1 illustrates the primary breaker handle 34 in the OFF position, however, it can be appreciated that shifting the primary breaker handle 34 toward the second sidewall 24 places the primary breaker handle 34 in the ON position. Similarly, the secondary circuit breaker 14 includes a secondary breaker handle 36 in operable communication with a secondary circuit breaker switch for switching between a secondary breaker powered position (i.e., ON position) and a secondary breaker unpowered position (i.e., OFF position). FIG. 1 illustrates the secondary breaker handle 36 in the ON position, however, it can be appreciated that shifting the secondary breaker handle 36 toward the second sidewall 24 places the secondary breaker handle 36 in the OFF position.

A retaining insert 40 includes a base portion 42 and a retaining portion 44. The base portion 42 comprises a first portion 46 and a second portion 48. The base portion 42 is disposed within a gap 50 defined by the primary circuit breaker 12 and the secondary circuit breaker 14. The base portion 42 may be configured in a relatively rectangular cross-section, however, the base portion 42 may taper inwardly from the first portion 46 to the second portion 48, or vice versa. In a fully inserted condition of the retaining insert 40, the first portion 46 is located generally coplanar with a primary circuit breaker plane 52. Specifically, the base portion 42 extends away from the base wall 20 to approximately a first side 41 of the primary circuit breaker 12, where the primary circuit breaker plane 52 may substantially correspond with an open side of the enclosure 18. Proximate the second portion 48 of the base portion 42 is a mount interface 54 of the retaining insert 40. The mount interface 54 is configured to locate and operatively couple the retaining insert 40 to the base assembly 30, but it is also contemplated that the mount interface 54 may facilitate locating and/or mounting the retaining insert 40 to the base wall 20 of the enclosure 18. The mount interface 54 includes at least one aperture 56 sized to receive a mechanical fastener or alternatively may include a protrusion that is configured to engage a receiving component. In the exemplary embodiment, the mount interface 54 comprises an outwardly extending bracket with the at least one aperture 56. Although illustrated and described as a single mount interface, it is contemplated that a plurality of mount interfaces proximate the second portion 48 may be employed to couple the retaining insert 40 to the base assembly 30.

The retaining portion 44 is integrally formed with the base portion 42 and includes a first segment 58 and a second segment 59. The first segment 58 is integrally formed with and extends toward the second end wall from the base portion 42. The first segment 58 extends at least partially within or just outside of a recess 60 located between the secondary circuit breaker 14 and the branch circuit breaker 16. The second segment 59 is integrally formed with and extends toward the base wall 20 from the first segment 58 further into the recess 60 and toward a recess wall 62 extending between the secondary circuit breaker 14 and the branch circuit breaker 16, or of the pair of opposing circuit breakers. The recess wall 62 is aligned relatively parallel to the base wall 20 and at least partially defines the recess 60. The second segment 59 may extend relatively perpendicularly to the first segment 58 or may extend toward the base wall 20 in an angular manner. Irrespective of the precise alignment of the second segment 59, a second segment end 64 is disposed in close proximity to the recess wall 62 and in one embodiment contacts the recess wall 62 when the retaining insert 40 is disposed in a fully inserted condition. Based on the "plug-in" nature of the secondary circuit breaker 14, the retaining portion 44 reduces the likelihood of inadvertent removal of the secondary circuit breaker 14. Additionally, the retaining portion 44 is a structural element that reduces the exposure of live electrical circuitry that may be accessed proximate the recess 60.

An interlock assembly 70 includes an interlock bracket 72 and a locking member 74. The interlock bracket 72 is fixedly mounted to the base portion 42 of the retaining insert 40 via one or more mechanical fasteners extending through at least one interlock bracket aperture 76 that corresponds to at least one base portion aperture 78. The locking member 74 includes at least one slot 80 extending in a longitudinal direction corresponding to the first sidewall 22 and the second sidewall 24 longitudinal directions. The at least one slot 80 is configured to receive a retaining member (not illustrated), such as a pin, that extends through the at least one slot 80 and retaining member apertures 82 disposed in the interlock bracket 72. The retaining member may include a head portion that extends partially over a first surface 84 of the locking member 74, thereby retaining the locking member 74, while providing a moveable engagement of the locking member 74 to the interlock bracket 72. Specifically, the locking member 74 is free to slide between a first position 86 and a second position 88 (shown in FIGS. 5 and 6), described in greater detail below.

Figure 3:
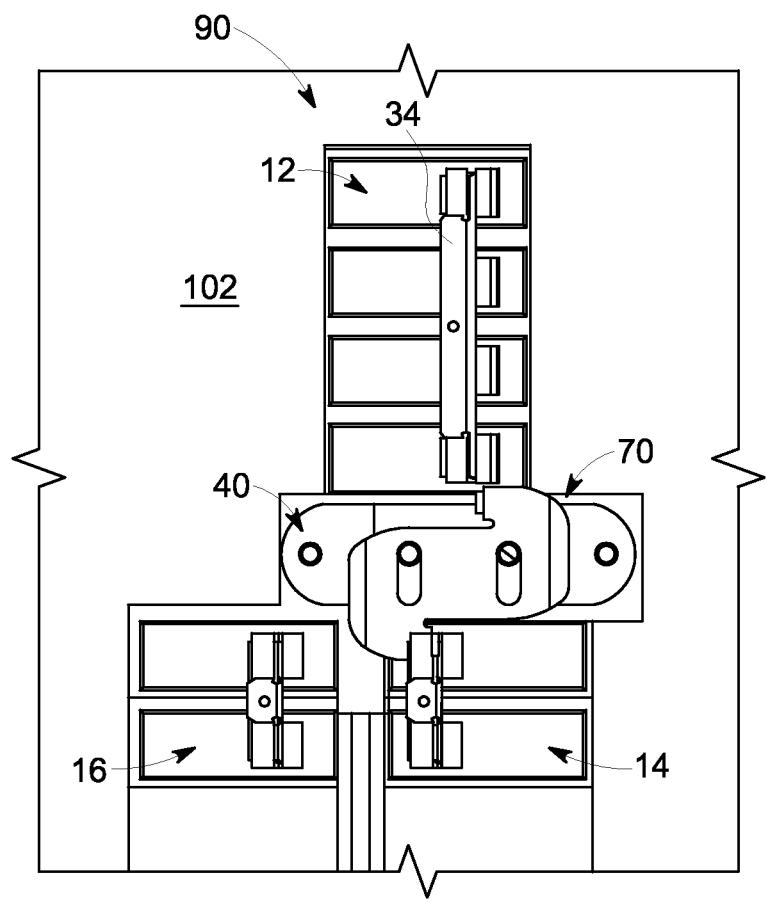
FIG. 3 is a front, elevational view of the electrical panelboard assembly having a cover enclosing at least a portion of the electrical panelboard assembly.
Figure 4:
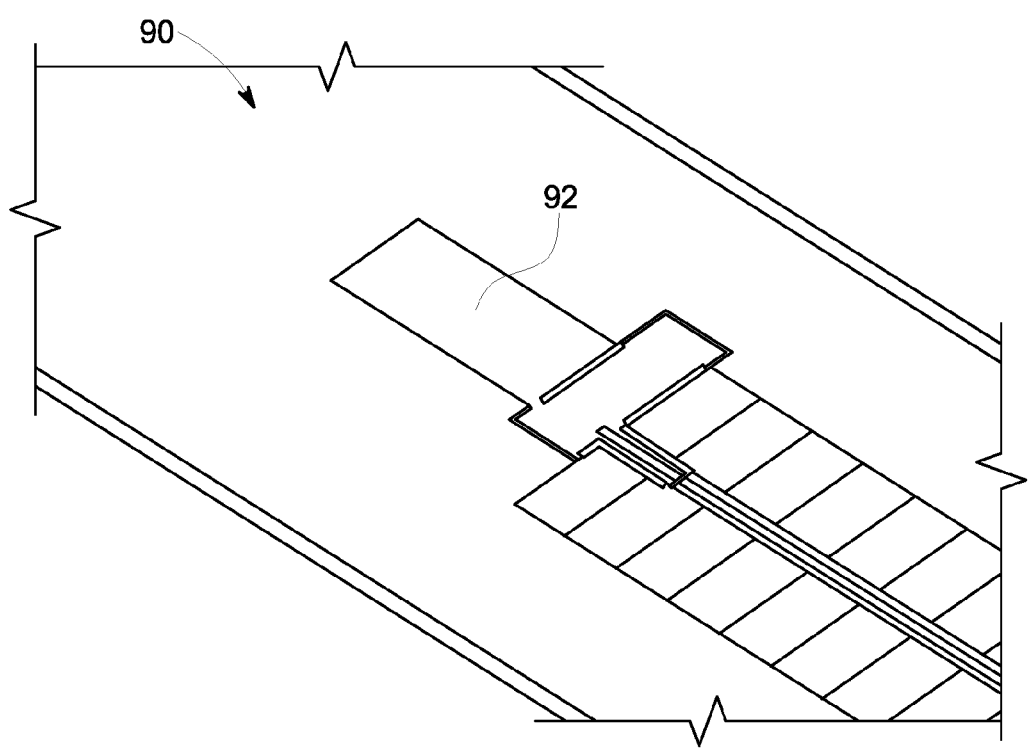
FIG. 4 is a perspective view of the cover.

Referring now to FIGS. 3 and 4, a cover 90 disposed proximate an open side of the enclosure 18, and more particularly proximate a first edge of the first sidewall 22, the second sidewall 24, the first end wall 26 and the second end wall. The cover 90 is operatively coupled to the enclosure 18 and is configured to reduce exposure of electrical components located within the enclosure 18. A cutout portion 92 of the cover 90 exposes at least a portion of the primary circuit breaker 12, at least a portion of the interlock assembly 70 and at least a portion of the secondary circuit breaker 14. Additionally, the cutout portion 92 also exposes at least a portion of the branch circuit breaker 16 and it is contemplated that several other branch circuit breakers may be exposed by the cutout portion 92. While illustrated and described as a full cutout, the cutout portion 92 may comprise a "knockout" portion that includes a relatively solid face for the cover 90, but includes a plurality of perforations patterned to correspond to desired exposure of the primary circuit breaker 12, the interlock assembly 70, the secondary circuit breaker 14 and the branch circuit breaker 16. The knockout portion may be removed by tearing along the perforations to provide the desired exposure.

Figure 5:
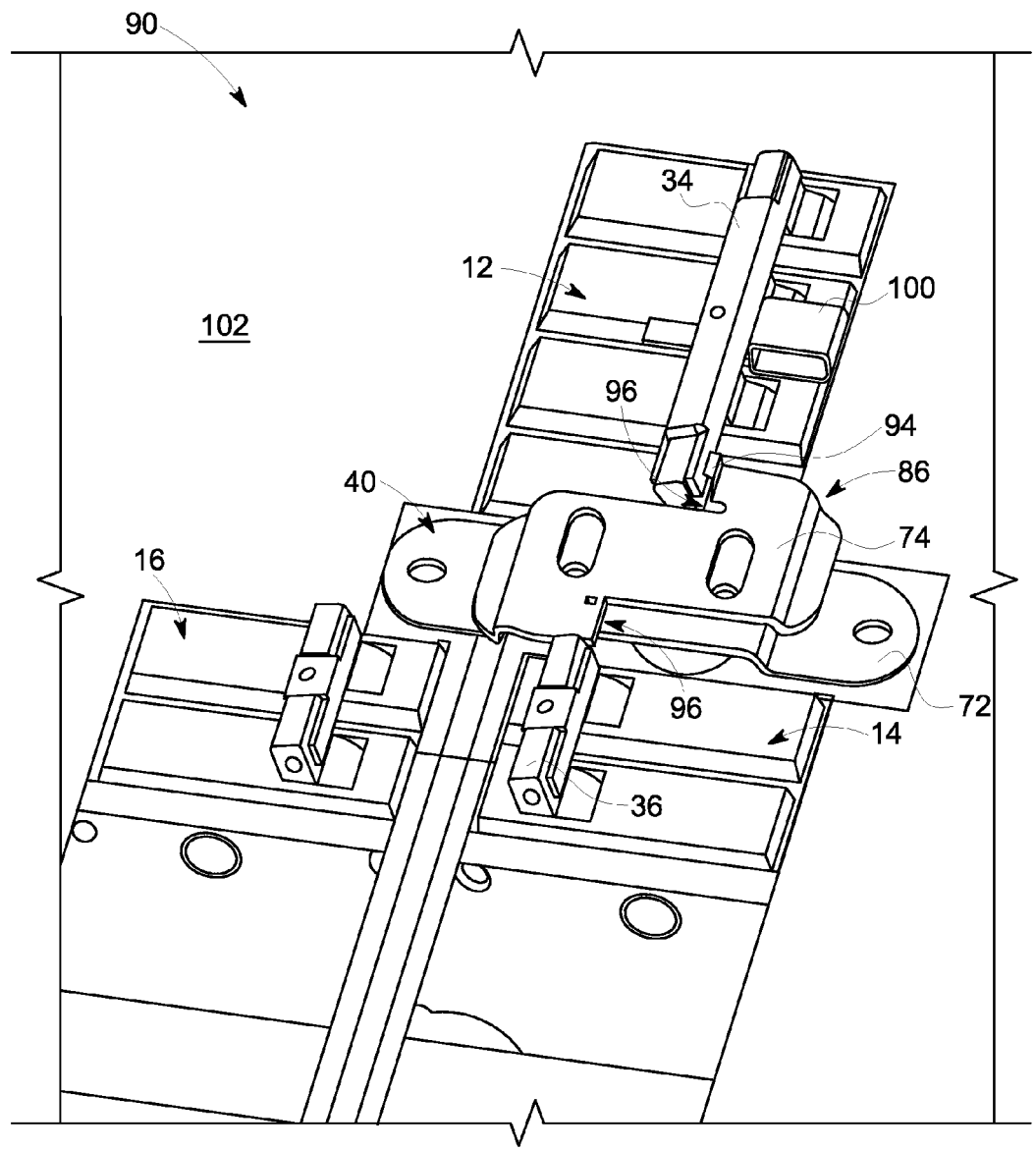
FIG. 5 is a front, perspective view of the electrical panelboard assembly having an interlock assembly in a first position.
Figure 6:
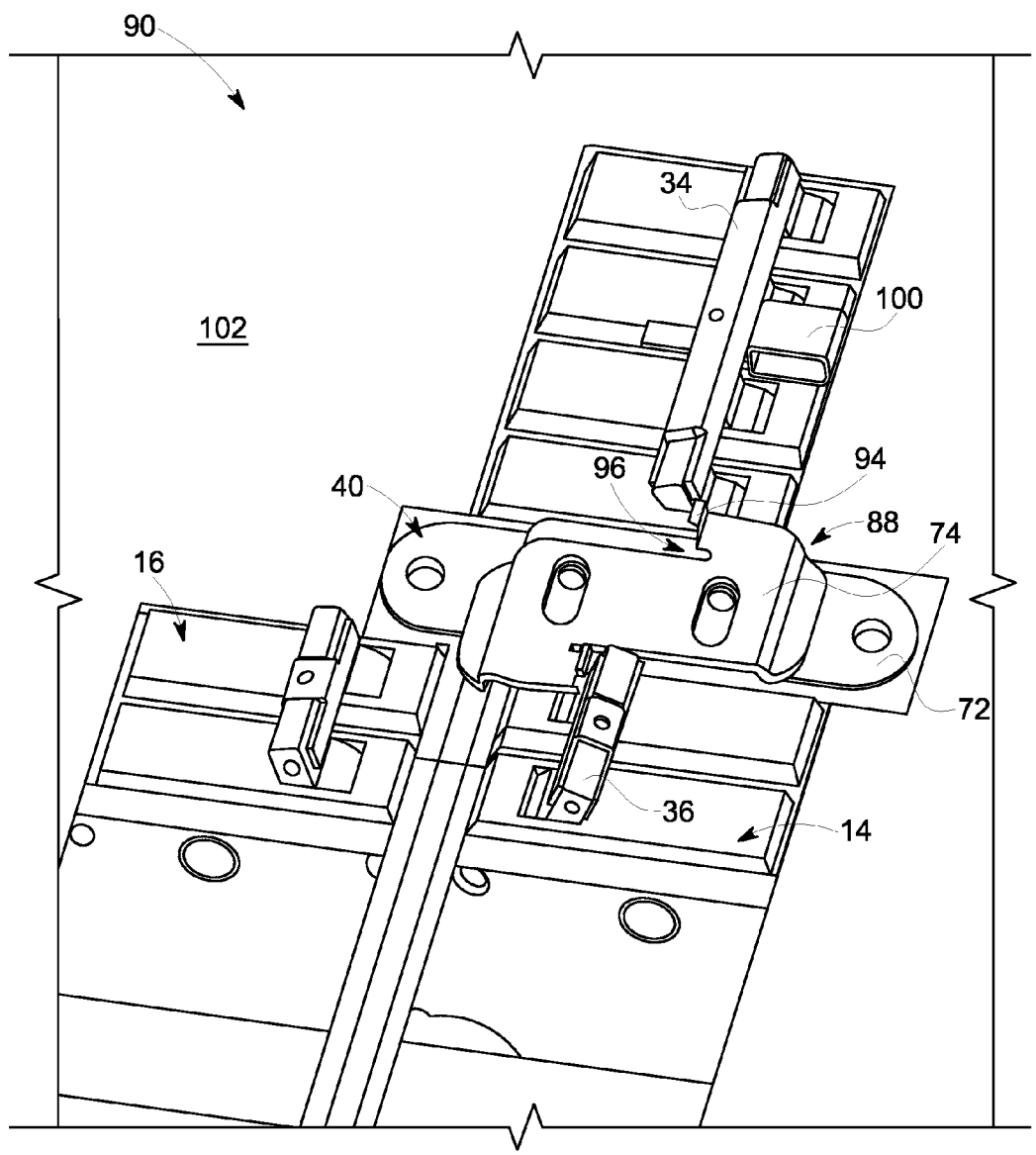
FIG. 6 is a front, perspective view of the interlock assembly in a second position.

Referring now to FIGS. 5 and 6, positioning of the locking member 74 is illustrated in greater detail. The first position 86 of the locking member 74 (FIG. 5) corresponds to a fully extended location of the locking member 74, relative to the interlock bracket 72. In the first position 86, an extending tab 94 is in close proximity to the primary breaker handle 34 and locks the primary breaker handle 34 in the primary breaker unpowered position (i.e., OFF position), based on the prevention of movement of the primary breaker handle 34 to the ON position. While in the first position 86, it can be appreciated that the secondary breaker handle 36 is free to move between the ON and OFF positions. In this way, the interlock assembly 70 does not allow simultaneous movement of the primary breaker handle 34 and the secondary breaker handle 36 to the ON positions. The second position 88 of the locking member 74 (FIG. 6) corresponds to a fully extended location of the locking member 74 in an opposite direction of the first position 86, relative to the interlock bracket 72. In the second position 88, a notched region 96 that may contain a tab similar to that of the extending tab 94 is in close proximity to the secondary breaker handle 36 and locks the secondary breaker handle 36 in the secondary breaker unpowered position (i.e., OFF position), based on the prevention of movement of the secondary breaker handle 36 to the ON position. While in the second position 88, it can be appreciated that the primary breaker handle 34 is free to move between the ON and OFF positions.

A blocking member 100 is disposed in operable communication with at least one of the primary circuit breaker 12 and the primary breaker handle 34. The blocking member 100 is configured to slide from side-to-side between a first blocking position and a second blocking position as a result of movement of the primary breaker handle 34 between the ON and OFF positions. The blocking member 100 is driven by movement of the primary breaker handle 34. The blocking member 100 may be driven by the primary breaker handle 34 in a variety of manners. In one embodiment, the blocking member 100 is directly coupled to the primary breaker handle 34, such that as the primary breaker handle 34 is moved toward the ON or OFF positions, the blocking member 100 is pushed or pulled, respectively, by the primary breaker handle 34. In an alternative embodiment, the blocking member 100 may be biased, such as by a spring, toward the OFF position of the primary breaker handle 34. Upon movement of the primary breaker handle 34 toward the ON position, the blocking member 100 is driven by the primary breaker handle 34.

Irrespective of the precise manner of driving the blocking member 100 by the primary breaker handle 34, when the primary breaker handle 34 is disposed in the ON position, the blocking member 100 is moved toward the second sidewall 24 and extends at least partially over a surface 102 of the cover 90, thereby reducing the likelihood of removal of the cover 90 during an ON condition of the primary breaker handle 34. A similar function is achieved with the interlock assembly 70 when the secondary breaker handle 36 is in the ON position. As described in detail above, the locking member 74 must be in the first position 86 to allow the secondary breaker handle 36 to be in the ON position. In the first position 86, at least a portion of the locking member 74 extends over the surface 102 of the cover 90, thereby reducing the likelihood of removal of the cover 90 during an ON condition of the secondary breaker handle 36. In conjunction, the blocking member 100 and the interlock assembly 70 reduce the ability of the cover 90 to be removed when either the primary breaker handle 34 or the secondary breaker handle 36 is disposed in the ON position.

Figure 7:
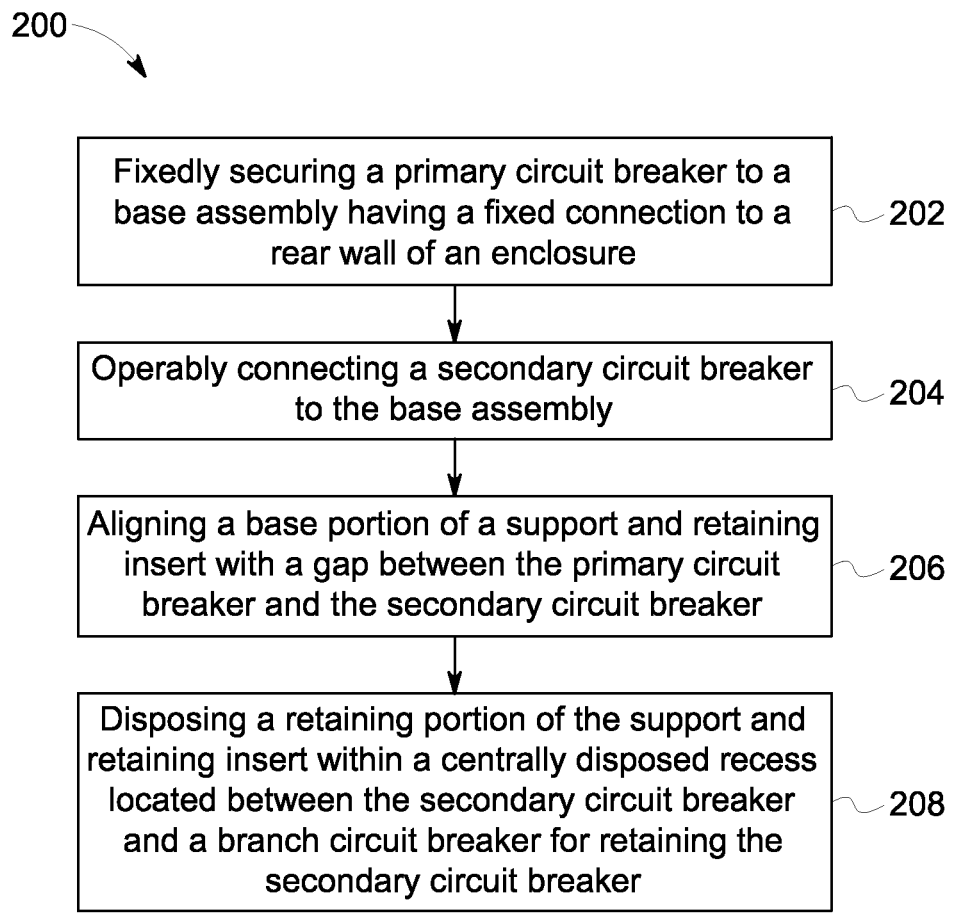
FIG. 7 is a flow diagram illustrating a method of retaining the electrical panelboard assembly.

As illustrated in the flow diagram of FIG. 7, and with reference to FIGS. 1-6, a method of retaining an electrical panelboard assembly 200 is also provided. The electrical panelboard assembly 10 and associated components have been previously described and specific structural components need not be described in further detail. The method of retaining an electrical panelboard assembly 200 includes fixedly securing 202 the primary circuit breaker 12 to the base assembly and operatively connecting 204 the secondary circuit breaker 14 to the base assembly 30, such as in the plug-in manner described above. The method also includes aligning 206 the base portion 42 of the retaining insert 40 with a gap 50 between the primary circuit breaker 12 and the secondary circuit breaker 14. The base portion 42 is typically operatively coupled to the base assembly 30 in a fully inserted condition, but it is contemplated that the base portion 42 may be coupled to the base wall 20 of the enclosure 18. Alignment and insertion of the retaining insert 40 disposes 208 the retaining portion 44 within the recess 60 located between the secondary circuit breaker 14 and the branch circuit breaker 16 for retaining the secondary circuit breaker 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A retaining insert coupleable to a base assembly configured to operatively support a primary circuit breaker and a pair of opposing circuit breakers arranged to define a recess, the retaining insert comprising:
    a base portion configured to be disposed between the primary circuit breaker and the pair of opposing circuit breakers, the base portion configured to be operatively coupled to the base assembly;
    a retaining portion extending from the base portion and configured to retain the pair of opposing circuit breakers, the retaining portion comprising a first segment and a second segment, the first segment extending from the base portion, the second segment extending toward the base assembly from the first segment to a location proximate a recess wall of the pair of opposing circuit breakers, the recess wall at least partially defining the recess; and
    an interlock assembly comprising:
        an interlock bracket operatively coupled to the base portion of the retaining insert; and
        a locking member moveably engaged with the interlock bracket.

2. The retaining insert of claim 1, the base portion comprising a mount interface defining an aperture, the aperture sized to receive a mechanical fastener to couple the retaining insert to the base assembly.

3. The retaining insert of claim 1, the locking member moveable between a first position and a second position, the locking member configured to lock the primary circuit breaker when the locking member is in the first position and configured to lock at least one of the pair of opposing circuit breakers when the locking member is in the second position.

4. The retaining insert of claim 1, further comprising a cover moveable between a closed position and an open position that exposes at least a portion of the primary circuit breaker, at least a portion of an interlock assembly and at least a portion of the pair of opposing circuit breakers.

5. The retaining insert of claim 4, further comprising a blocking member moveable between a first blocking position and a second blocking position, the blocking member configured to impede removal of the cover in the second blocking position.

6. The retaining insert of claim 4, further comprising a locking member moveable between a first position and a second position, the first position corresponding to disposal of the locking member over at least a portion of the cover to impede removal of the cover.

7. The retaining insert of claim 1, wherein the base assembly is configured to couple to a panelboard interior.

8. The retaining insert of claim 1, wherein the second segment of the retaining portion is disposed at an angle of about 90 degrees relative to the first segment.

9. An electrical protection system comprising:
   an enclosure having a base wall and a plurality of walls extending relatively perpendicularly from the base wall;
   a base assembly coupled to an interior portion of the enclosure, the base assembly configured to operatively support a primary circuit breaker and a pair of opposing circuit breakers that define a recess; and
   a retaining insert comprising:
      a base portion operatively coupled to the base assembly;
      a retaining portion comprising a first segment and a second segment, the first segment integrally formed with and extending from the base portion, the second segment integrally formed with and extending from the first segment toward the second portion of the base portion, the retaining portion configured to be at least partially disposed within the recess to retain the pair of opposing circuit breakers; and
   an interlock assembly comprising:
      an interlock bracket operatively coupled to the base portion of the retaining insert; and
      a locking member moveably engaged with the interlock bracket.

10. The electrical protection system of claim 9, the base portion comprising a mount interface defining an aperture, the aperture sized to receive a mechanical fastener to couple the retaining insert to the base assembly.

11. The electrical protection system of claim 9, wherein the base portion of the retaining insert is disposed between the primary circuit breaker and the pair of opposing circuit breakers, the base portion extending from proximate a first portion of the primary circuit breaker to a second portion of the primary circuit breaker.

12. The electrical protection system of claim 9, the locking member moveable between a first position and a second position, the locking member configured to lock the primary circuit breaker when the locking member is in the first position and configured to lock the pair of opposing circuit breakers when the locking member is in the second position.

13. The electrical protection system of claim 9, further comprising a cover moveable between a closed position and an open position that exposes at least a portion of the primary circuit breaker, at least a portion of an interlock assembly and at least a portion of the pair of opposing circuit breakers.

14. The electrical protection system of claim 9, wherein the second segment of the retaining portion is disposed at an angle of about 90 degrees relative to the first segment.

15. A method of retaining an electrical panelboard assembly comprising:
   fixedly securing a primary circuit breaker to a base assembly having a fixed connection to a base wall of an enclosure;
   connecting a secondary circuit breaker to the base assembly;
   aligning a base portion of a retaining insert with a gap between the primary circuit breaker and the secondary circuit breaker;
   disposing a retaining portion of the retaining insert within a centrally disposed recess located between the secondary circuit breaker and a branch circuit breaker for retaining the secondary circuit breaker, the retaining portion comprising a first segment and a second segment, the first segment extending from the base portion, the second segment extending toward the base assembly from the first segment to a location proximate a recess wall of the pair of opposing circuit breakers, the recess wall at least partially defining the recess;
   coupling an interlock bracket of an interlock assembly to the base portion of the retaining insert, wherein the interlock bracket of the interlock assembly is configured to lock the primary circuit breaker and the secondary circuit breaker with a locking member movingly engaged with the interlock bracket; and
   movably engaging a locking member of the interlock assembly with the interlock bracket.

* * * * *